(12) United States Patent
Mosjidis

(10) Patent No.: US 8,680,369 B2
(45) Date of Patent: Mar. 25, 2014

(54) SUNN HEMP CULTIVARS CAPABLE OF PRODUCING SEED WITHIN THE CONTINENTAL UNITED STATES

(75) Inventor: Jorge Mosjidis, Auburn, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 13/472,193

(22) Filed: May 15, 2012

(65) Prior Publication Data

US 2013/0007918 A1    Jan. 3, 2013

Related U.S. Application Data

(60) Provisional application No. 61/503,828, filed on Jul. 1, 2011.

(51) Int. Cl.
*A01H 5/00*    (2006.01)

(52) U.S. Cl.
USPC .......................................................... 800/298

(58) Field of Classification Search
None
See application file for complete search history.

(56) References Cited

PUBLICATIONS

Bhardwaj et al (Industrial Crops and Products 22: 151-155, 2005).*
Balkcom, K.S. et al., "Planting date and seeding rate effects on Bunn hemp biomass and nitrogen production for a winter cover crop,"(2011) International Journal of Agronomy, vol. 2011, Article ID: 237510, 8 pages.
Potter, T.L. et al., "Summer cover crops reduce Atrazine leaching to shallow groundwater in Southern Florida," (2007) J. Environ. Qual. 36:1301-1309.
United States Department of Agriculture Plant Fact Sheet, http://plant-materials.nrcs.usda.gov/intranet/pfs.html, Edited Jun. 5, 2006.
Wang, Q. et al., "Cover crops and organ mulch to improve tomato yields and soil fertility," (2009) Agronomy Journal 101:345-351.

* cited by examiner

*Primary Examiner* — Shubo (Joe) Zhou
*Assistant Examiner* — Keith Robinson
(74) *Attorney, Agent, or Firm* — Andrus, Sceales, Starke & Sawall, LLP

(57) ABSTRACT

Sunn hemp plants capable of flowering and producing seed when grown in the continental United States are provided. Two plant varieties capable of flowering and producing seed when grown in the continental United States, named AU Golden and AU Durbin, are described herein.

21 Claims, 15 Drawing Sheets
(15 of 15 Drawing Sheet(s) Filed in Color)

SUNN HEMP CULTIVARS CAPABLE OF PRODUCING SEED WITHIN THE CONTINENTAL UNITED STATES

CROSS-REFERENCE TO RELATED APPLICATIONS

This patent application claims the benefit of priority of U.S. Provisional Patent Application No. 61/503,828, filed Jul. 1, 2011, which is incorporated herein by reference in its entirety.

INTRODUCTION

Sunn hemp (*Crotalaria juncea* L.) is the most widely grown green manure in the tropics where it is also used as a fiber and animal fodder crop. It is an annual summer legume adapted to a wide range of environmental conditions and soil types. Thus, it can be used as a summer cover crop to protect and conserve soil and water resources. This species is an ideal cover crop-green manure because of its fast growth, nitrogen fixation capacity, ability to suppress weed growth and capacity to suppress soil root nematodes.

It was introduced in the USA in 1899 from Brazil together with other *Crotalaria* species for their ability to grow under low fertility conditions, nematode resistance, and their capacity to produce organic matter that improves the soil. However, sunn hemp did not get as much attention as other crotalarias because of establishment problems and its use in the continental USA was restricted by its limited ability to produce seed in subtropical/temperate climates.

The National Academy of Science (1979) studied the potential use, benefits and limitations of sunn hemp. It concluded that it was necessary to establish a breeding program to resolve the factors that limited worldwide use of this plant. Tropic Sun is the only cultivar developed in the USA. It was developed in Hawaii by joint work of the University of Hawaii and USDA-Soil Conservation Service. Sunn hemp is a tropical plant and it cannot produce seed above 24° N latitude. In addition, sunn hemp must have ample sunlight and not receive rainfall during fruit set. Tropic Sun is considered by its developers to have inconsistent seed production above 28° N latitude. Some seed production has been reported in locations such as south Florida and southern parts of Texas. But the fact remains that commercial seed of Tropic Sun cannot be produced in the continental USA even in areas around 28° N latitude due to long days and cool temperatures. Management practices such as cutting the stems of tropical cultivars to increase flower production met limited success because it increased the growth period to flowering thus seed production cannot be achieved.

SUMMARY

Sunn hemp plants capable of flowering and producing seeds when grown in a sub-tropic or temperate climate are provided herein. In particular, the sunn hemp plants are capable of producing more than 400 pounds of seed per acre when grown in areas north of 28° latitude north or south of 28° latitude south with a germination rate of 70% or higher.

In one aspect, two sunn hemp varieties, named AU Golden and AU Durbin are provided. These varieties are capable of producing seed when grown in a sub-tropic or temperate climates.

In another aspect, progeny, seeds and other parts of the plants described herein are provided.

In a still further aspect, methods of producing a commodity plant product are provided. The methods include obtaining the plants capable of producing seed described herein or portions thereof and producing commodity plant products therefrom.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
FIG. 1 is a photograph of the Tropic Sun and AU Golden sunn hemp grown in Alabama in 2011. AU Golden has fruits and flowers whereas Tropic Sun has neither. Tropic Sun produces immature inflorescence, few mature flowers and immature fruits with few if any seeds.

Sunn hemp is a tropical plant and it generally cannot produce seed outside of tropical regions, e.g., north of 24° N latitude. At least one sunn hemp variety, Tropic Sun, can grow within the continental United States but does not reproducibly produce seed when grown at latitudes north of 28° N latitude. Development of sunn hemp varieties capable of reproducibly flowering and producing seed when grown in the continental United States is desired.

Sunn hemp plants capable of flowering and/or producing seeds when grown in a sub-tropic or temperate climate are provided herein. In particular, the sunn hemp plants are capable of producing more than 400 pounds of seed per acre with a germination rate of 70% or more when grown in areas north of 28° latitude north or south of 28° latitude south. Suitably, the plants are capable of flowering and/or producing seeds when grown between 28° latitude and 40° latitude either north or south. Notably, the sunn hemp plants described herein are capable of producing seed in tropic regions as well.

Thus, the plants described herein are capable of flowering and/or producing seeds when grown between 40° north and 40° south latitude.

The sunn hemp plants described herein are capable of producing at least 400 pounds of seed per acre when grown north of 28° latitude north or south of 28° latitude south. Suitably, the plants are capable of producing at least 500, 550, 600, 650, 700, 750, 1000, 1100, 1200, 1300, 1400, 1500 or even 1600 pounds of seed per acre of plants when grown in areas north of 28° latitude north or south of 28° latitude south. The germination rate of the seeds is at least 60%, 65%, 70%, 75%, 80%, 85%, 90%, 95% or more.

A majority of sunn hemp plants described herein produce flowers and mature fruit when grown outside of tropical regions. Suitably, at least 60%, 70%, 75%, 80%, 85%, 90%, 95%, 96%, 97%, 98%, 99% or even 100% of the plants produce mature flowers. Suitably, at least 55%, 60%, 70%, 75%, 80%, 85%, 90%, 95%, 96%, 97%, 98%, 99% or even 100% of the plants produce fruit. Suitably, at least 55%, 60%, 70%, 75%, 80%, 85%, 90%, 95%, 96%, 97%, 98%, 99% or even 100% of the plants produce seed.

In the Examples, two distinct cultivars of sunn hemp derived from distinct publicly available parental plant introductions are described. The sum hemp cultivars are uniform and stable. A deposit of each of the sunn hemp cultivars AU Durbin and AU Golden, which are disclosed herein and referenced in the claims, will be made with the American Type Culture Collection ATCC), 10801 University Blvd., Manassas, Va. 20110-2209. The date of deposit is Sep. 5, 2013 and the accession number for the deposited seeds of AU Durbin is ATCC Accession No. PTA-120576 and the accession number for the deposited seeds of AU Golden is ATCC Accession No. PTA-120577. All restrictions upon the deposit have been removed, and the deposit is intended to meet all of the requirements of 37 C.F.R. §1.801-1.809. The deposit will be maintained in the depository for a period of 30 years, or 5 years after the last request, or for the enforceable life of the patent, whichever is longer, and will be replaced if necessary during that period.

Plants derivable from AU Golden and AU Durbin are also provided herein. Derivable includes plants from the seeds as deposited, but also includes progeny of the plants described herein, plant parts or portions from the plants and the resulting seeds. Sunn hemp is an open pollinated plant and thus has variability larger than plants that reproduce by other means. Also included are progeny of the plants described herein or F1 hybrids of the plants described herein. The plants described herein may be grown in a field or under any other circumstance.

Hybrid seeds and hybrid plants derived from the plants described herein are also provided. A hybrid plant may be produced by crossing or allowing open pollination of the plants described herein with other distinct varieties of sunn hemp. For example, the two sunn hemp cultivars, AU Golden and AU Durbin may be crossed or planted in proximity to each other to allow for cross-pollination. Some of the resulting seeds may be selected and be hybrids. Alternatively, the cultivars described herein may be crossed with tropical varieties of sunn hemp.

Tropical sunn hemp varieties available prior to this disclosure do not produce seed under the day length and temperature conditions of the continental USA. With the development of seed producing cultivars for subtropical/temperate climates, this plant has the potential to be widely grown as a green manure/cover crop, forage and for industrial use, such as a feedstock for the production of bioenergy in the continental USA. Methods of producing a commodity product from the sunn hemp plants described herein are also provided. The methods include obtaining the plants described herein or parts or portions thereof and using it to produce a plant-based product.

The potential uses and products made from the sunn hemp plants described herein include seed production, green manure, animal feed, fiber-based products, plastic or synthetic-based products reinforced with the plant's fibers, bioenergy, protein concentrate or protein isolate. Fiber-based products include, but are not limited to, pulp, paper, cardboard and panel products, including newsprint, sound proofing materials, etc., packing materials, absorbent agents, renewable plastics alternative, natural or bio-fuels, cellulose products, animal fodder or feed for direct feeding of animals or after isolation of protein as a food-additive. Plastic or synthetic-based products reinforced with the plant's fibers include, but are not limited to, plastic bags and containers, automobile parts and body, other machinery parts. The seeds may be used to produce additional sunn hemp, for selection of new seed-producing varieties of sunn hemp, or as a food product.

In addition, plant parts including leaves, flowers, fruits, seeds, fiber, stalk or materials derived from the plant parts are also provided herein. The seeds may be packaged into a container and sold.

The following examples are meant only to be illustrative and are not meant as limitations on the scope of the invention or of the appended claims. All references cited herein are hereby incorporated by reference in their entireties.

EXAMPLES

Example 1

AU Golden Sunn Hemp Cultivar

Origin

Sunn hemp is an open pollinated species. AU Golden is a selection from accession PI 322377 that was obtained from the National Plant Germplasm System. This accession was introduced from Brazil where it had unknown origin.

A breeding program aimed at developing cultivars that can produce seed under the climatic conditions of Alabama (humid subtropical climate) has been conducted at Auburn University since 2002.

In 2003, accession PI 322377 was identified as having the potential to serve as a base population for a breeding program aimed at developing a seed-producing cultivar in humid subtropical climates. Seed of PI 322377 were sown into individual cells in greenhouse flats in March 2003, about a month before transplanting each plant to the field. Those plants that were able to reproduce under the environmental conditions of central Alabama were kept in isolation and harvested. This material constituted the original plant material (Cycle 0) used in a selection scheme to developed a seed producing cultivar for the continental USA.

Selection and Multiplication

In 2004, seed of Cycle 0 were direct seeded under isolation at Tallassee, Ala. The field was stratified by sowing four sections with 10 rows each. Each row was 12 m long and 2 m wide (40 feet by 80 inches). The field had about 3,200 plants. Plants were selected before and after flowering from each of the 40 rows. Seed was harvested from each selected plant. The top seed producers that had good seed quality were kept. About 5% of the plants were selected to form Cycle 1. Additional cycles of selection were conducted in 2005, 2006 and 2007 using a similar selection protocol. The resulting population from 2007 was Cycle 4. In 2008, seed was increased and elimination of late-flowering plants was conducted. In 2009 and 2010, seed of the new population was increased.

Phenotypic recurrent selection (mass selection with male and female plant selection) was used for traits that can be selected up to flowering such as early flowering date and plant height at flowering. Additional traits considered in the selection process at this stage were flowering uniformity and lodging resistance. After flowering, traits such as high fruit setting, uniform fruit maturity, plant height at maturity, high seed yield and high seed quality, were selected using mass selection (only female plants were selected after pollination).

Statements of Uniformity and Stability

AU Golden is an open pollinated cultivar. All open pollinated plants have an inherent variability larger than plants with other types of reproduction. AU Golden has been observed for two generations of seed increase and it is uniform and stable. It may have some slightly taller and later maturing plants at a frequency of less than 0.5%. AU Golden shows no variants other than what would normally be expected due to environment and genetic variability inherent to open pollinated plants.

AU Golden Distinguishing Characters from PI 322377

Differences between AU Golden and PI 322377 underestimate the actual values because not all plants grown from the seed obtained from the National Plant Germplasm System matured and reproduced. Statistics of each character are in Table 1. All these characters were significantly different at the two locations where tested. They are:

1) Diameter of the Main Stein at the Base at Flowering Time. AU Golden has thinner stems (7.0-6.3 cm) than PI 322377 (9.3-8.6 cm). Standard deviation of the values for AU Golden was smaller than for PI 322377.
2) Height to First Flower. AU Golden starts flowering at a lower height (69.6-71.9 cm) than PI 322377 (98.6-88.4 cm). Standard deviation of the values for height to first flower of AU Golden was much smaller than for PI 322377.
3) Days to Seed Harvest. AU Golden needed 17-20 days less than PI 322377 to harvest seeds (128.4-123.8 vs.148.6-140.6 days, respectively). Standard deviation of the values for AU Golden was smaller than for PI 322377. Seed of some late flowering plants of PI 322377 were not harvested because the plants were too late to mature, thus all the statistics of days to seed harvest underestimate the actual difference between AU Golden and PI 322377.
4) Height at Seed Harvest. AU Golden had shorter plants (153.0-144.3 cm) than PI 322377 (185.0-170.9 cm) at seed harvest. Standard deviation of the values for AU Golden was smaller than for PI 322377. Seed of some late flowering plants of PI 322377 were not harvested because the plants were too late to mature, thus all the statistics of height at seed harvest underestimate the actual difference between AU Golden and PI 322377.

AU Golden and PI 322377 were compared in experiments conducted at two locations (Tallassee and Shorter) in Ala. Soil at Tallassee was a Norfolk sandy loam (fine-loamy, mixed, thermic Typic Hapludult) and at Shorter was a Compass sandy loam (coarse-loamy, siliceous, subactive, thermic Plinthic Paleudults). The experiments were conducted in a randomized complete block design with five replications. Seeding dates were 28 Apr. and 24 Apr. 2009 at Tallassee and Shorter, respectively. Populations were assigned to plots that were two rows 36 inches (90 cm) apart and 15 feet (4.5 m) in length per population. In each replication, 40 random plants of each population were tagged and identified soon after emergence. Data were tested for equality of variance and differences between means of the two populations were tested using the t-test. Satterthwaite's method was used for the t-test for the few cases where variances were not equal. All data were analyzed using the SAS (v 9.1) statistical package (SAS Institute, 2003).

Statement of Distinctness Between AU Golden and Tropic Sun Sunn Hemp

Previously Existing Variety: AU Golden is most similar to Tropic Sun, a cultivar developed in Hawaii by joint work of the University of Hawaii and USDA-Soil Conservation Service. Tropic Sun is the only cultivar developed in the country.

Distinguishing Characters:

1) AU Golden can flower in the continental USA (100% of the plants that grew to maturity flowered at Tallassee and Shorter, Ala.) whereas Tropic Sun had only 5.4 -6% of the plants producing flowers (13 out of 200 plants flowered in 2008 at Tallassee, Ala.; 10 out 186 flowered in 2008 at Shorter, Ala.).

Figure 2:
FIG. 2 is a photograph of Tropic Sun and AU Durbin sunn hemp grown in Alabama in 2011. AU Durbin has fruits and flowers whereas Tropic Sun has neither.
Figure 3:
FIG. 3 is a photograph of a planting of Tropic Sun showing plants blooming in late September 2009.

Only some plants of Tropic Sun can have a few flowers. Most commonly, flowers in the inflorescence of Tropic Sun abort (FIG. 1). On the contrary, AU Golden produces healthy inflorescences and flowers (FIGS. 2 and 3).

Figure 4:
FIG. 4 is a photograph of Tropic Sun showing flowers in the middle of November 2009.
Figure 5:
FIG. 5 is a photograph of Tropic Sun showing a few fruits in early December 2011.
Figure 6:
FIG. 6 is a photograph of Tropic Sun inflorescence produced in late June 2008 Flower buds are yellowish and near abortion.
Figure 7:
FIG. 7 is a photograph of a Tropic Sun fruit and rotten seeds.
Figure 8:
FIG. 8 is a photograph of an AU Golden (indistinguishable from AU Durbin's) inflorescence taken in July 2007.
Figure 9:
FIG. 9 is a photograph of a planting of AU Golden showing most plants blooming.
Figure 10:
FIG. 10 is a photograph showing AU Golden mature seeds.
Figure 11:
FIG. 11 is a photograph showing AU Durbin mature seeds.
Figure 12:
FIG. 12 is a photograph showing AU Golden commercial seed production in North Alabama by a first-time producer.
Figure 13:
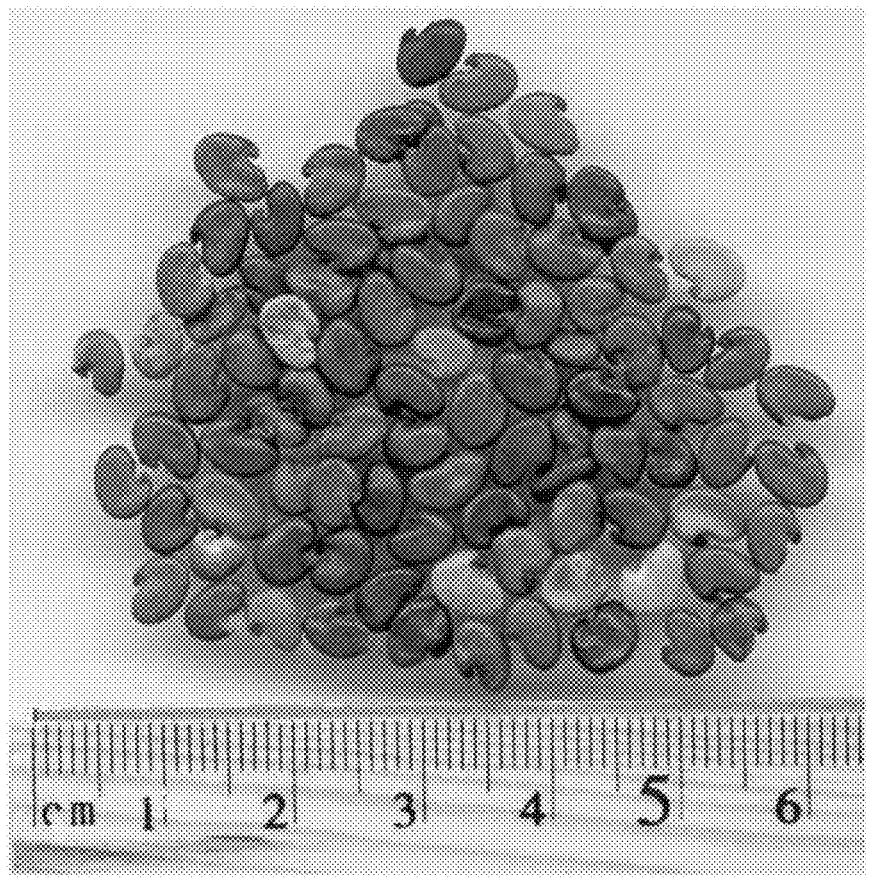
FIG. 13 is a photograph showing AU Golden commercial seed production in Central Alabama by a first-time producer.
Figure 14:
FIG. 14 is a photograph showing Tropic Sun commercial seed from Hawaii.
Figure 15:
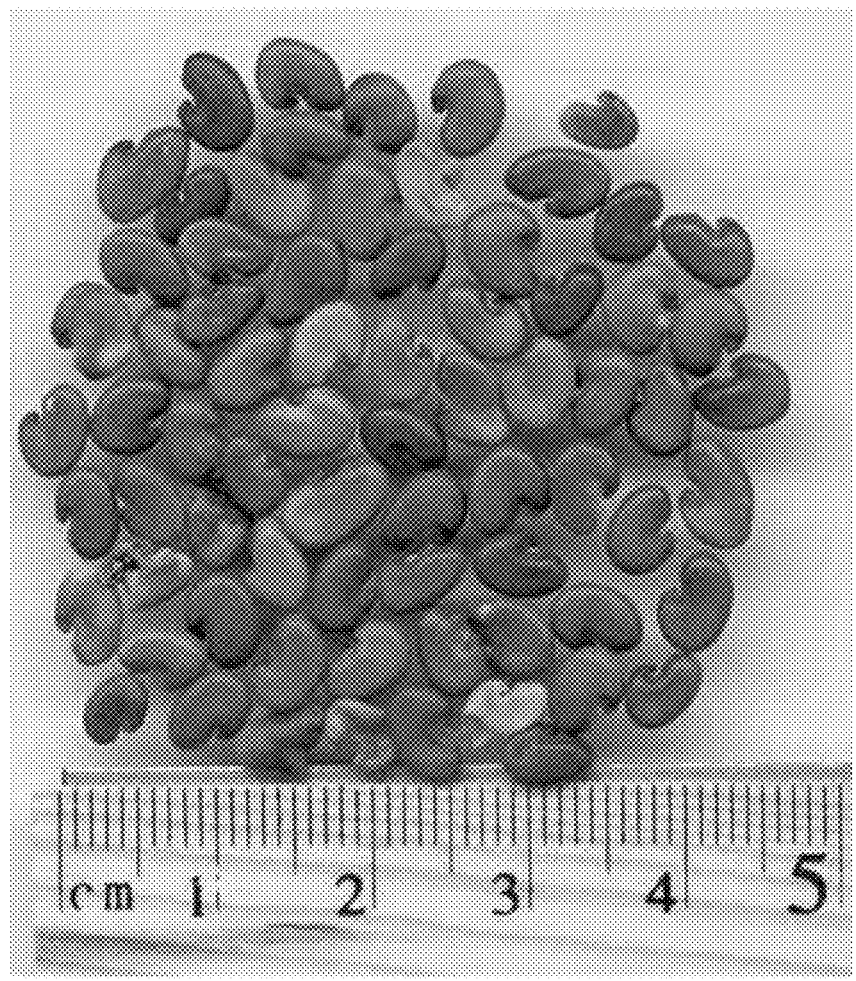
FIG. 15 is a photograph showing commercial seed imported from South Africa.

2) AU Golden can produce seed in the continental USA. All plants of AU Golden that survive up to maturity produce seed (FIGS. 4 and 5) whereas none of the Tropic Sun plants produced seed (FIG. 1). Rarely, one of the Tropic Sun plants has a fruit with a few rotten seeds (FIG. 1). Tropic Sun cannot produce commercial amounts of seeds in the continental USA even in areas that are around 28° N where some seed production has been reported in locations such as southern parts of Texas and Florida (FIG. 1). Tropic Sun is considered by its developers to have inconsistent seed production above 28° N.

We cannot provide data from a test comparing AU Golden to Tropic Sun in its ability to produce seed because Tropic Sun cannot produce seed (0 kg/ha, 0 lb/a) in our region whereas AU Golden produced 1,709-3,274 kg/ha (1,525-2,921 lb/a) in tests conducted in 2009 and 2010 at Tallassee and Shorter, Ala.

In addition to the above characters there are some quantitative characters that differentiate the two cultivars. Statistics of each character are in Table 1. All statistics of Tropic Sun plants underestimate the actual values because most plants did not flower. Thus differences between AU Golden and Tropic Sun presented here underestimate the true values. All these characters were significantly different at the two locations where tested. They are:

3) Number of Days from Planting to First Flower. AU Golden needed nearly half the time that Tropic Sun that needed to start flowering (49.8-48.8 days vs. 85.7-75.7days, respectively). Only a few plants of Tropic Sun were able to flower.
4) Diameter of the Main Stem at the Base at Flowering Time. AU Golden has thinner stems (8.2-12.6 cm) than Tropic Sun (17.1-28.0 cm).
5) Height to First Rower. AU Golden starts flowering at a lower height (79-87 cm) than Tropic Sun (192-187 cm).
6) Number of Branches. AU Golden had fewer branches (5.1-10.3) at the initiation of flowering than Tropic Sun (10.1-16.9).

AU Golden and Tropic Sun were compared in experiments conducted at two locations (Tallassee and Shorter) in Ala. Soil at Tallassee was a Norfolk sandy loam (fine-loamy, mixed, thermic Typic Hapludult) and at Shorter a Compass sandy loam (coarse-loamy, siliceous, subactive, thermic Plinthic Paleudults). The experiments were conducted in a randomized complete block design with five replications. Seeding dates were 23 Apr. and 2 May 2008 at Tallassee and Shorter, respectively. Populations were assigned to plots that were two rows 36 inches (90 cm) apart and 15 feet (4.5 m) in length per population. In each replication, 40 random plants of each population were tagged and identified soon after emergence. Some of those plants did not survive until maturity. Data were tested for equality of variance and differences between means of the two populations were tested using the t-test. Satterthwaite's method was used for the t-test for the few cases where variances were not equal. All data were analyzed using the SAS (v 9.1) statistical package (SAS Institute, 2003).

TABLE 1

Characteristics of the sunn hemp cultivar AU Golden that differentiate it from Tropic Sun. Mean (standard deviation) values, probability, t-value and number of plants measured (AU Golden, Tropic Sun) measured at Tallassee and Shorter, Alabama, in 2008 are presented.

| Populations | Days to First Flower | Stem Diameter at Base, mm | Height to First Flower, cm | Number of Branches |
|---|---|---|---|---|
| Tallassee | | | | |
| AU Golden | 49.8 (5.3) | 8.2 (1.9) | 79 (16.1) | 5.1 (2.2) |
| Tropic Sun | 85.7 (10.6) | 17.1 (2.9) | 192 (38.1) | 10.1 (3.6) |
| Probability | 0.005 | <0.001 | 0.005 | 0.028 |
| t-value | −7.1 | −10.1 | −7.3 | −3.9 |
| No. Plants | 190, 13 | 190, 13 | 190, 13 | 190, 13 |
| Shorter | | | | |
| AU Golden | 48.8 (6.2) | 12.6 (3.2) | 87 (20.2) | 10.3 (5.4) |
| Tropic Sun | 75.7 (4.1) | 28.0 (9.3) | 187 (28.6) | 16.9 (7.4) |
| Probability | <0.001 | 0.040 | <0.001 | 0.042 |
| t-value | −31.0 | −4.6 | −30.58 | −2.58 |
| No. Plants | 190, 10 | 190, 10 | 190, 10 | 190, 10 |

TABLE 2

Characteristics of the sunn hemp cultivar AU Golden that differentiate it from PI 322377. Mean (standard deviation) values, probability, t-value and number of plants measured (AU Golden, Tropic Sun) measured at Tallassee and Shorter, Alabama, in 2009 are presented.

| Populations | Stem Diameter at Base, mm | Height to First Flower, cm | Days to Harvest | Height at Harvest, cm |
|---|---|---|---|---|
| Tallassee | | | | |
| AU Golden | 7.0 (1.95) | 69.6 (15.63) | 128.4 (10.91) | 153.0 (18.53) |
| PI 322377 | 9.3 (3.18) | 98.6 (38.61) | 148.6 (24.43) | 185.0 (39.32) |
| Probability | <0.001 | <0.001 | 0.002 | <0.001 |
| t-value | 7.36 | 8.97 | 5.88 | 6.66 |
| No. Plants | 140, 140 | 140, 140 | 120, 120 | 120, 120 |
| Shorter | | | | |
| AU Golden | 6.3 (1.70) | 71.9 (17.23) | 123.8 (12.29) | 144.3 (20.11) |
| PI 322377 | 8.6 (3.65) | 88.4 (33.48) | 140.6 (23.30) | 170.9 (39.21) |
| Probability | <0.001 | 0.009 | 0.009 | 0.001 |
| t-value | 7.33 | 3.42 | 3.38 | 4.73 |
| No. Plants | 140, 140 | 140, 140 | 120, 120 | 120, 120 |

Example 2

AU Durbin Sunn Hemp Cultivar

Origin

Sunn hemp is an open pollinated species. AU Durbin is a selection from accession PI 207657 that was obtained from the National Plant Germplasm System. This accession was introduced from Japan but originated in Sri Lanka.

A breeding program aimed at developing cultivars that can produce seed under the climatic conditions of Alabama (humid subtropical climate) has been conducted at Auburn University since 2002.

In 2003, accession PT 207657 was identified as having the potential to serve as a base population for a breeding program aimed at developing a seed-producing cultivar in humid subtropical climates. Seed of PI 207657 were sown into individual cells in greenhouse flats in March 2003, about a month before transplanting each plant to the field. Those plants that were able to reproduce under the environmental conditions of central Alabama were kept in isolation and harvested. This material constituted the original plant material (Cycle 0, $C_o$) used in a selection scheme to developed a seed producing cultivar for the continental USA.

Selection and Multiplication

In 2004, seed of Cycle 0 were direct seeded under isolation at Tallassee, Ala. The field was stratified by sowing four sections with 10 rows each. Each row was 12 m long and 2 m wide (40 f by 80 in). The field had about 3,200 plants most of which were too tall. Only five plants were selected (0.16% of the population) and seed was harvested from each plant (Cycle 1). These plants were selected because of their lower plant height at seed maturity. An additional cycle of selection was conducted in 2008 at Tallassee using a similar selection protocol. The resulting population was Cycle 2. In 2009 and 2010, seed was increased.

Plants were selected before and after flowering. Seed was harvested from each selected plant. Phenotypic recurrent selection (mass selection with male and female plant selection) was used for traits that can be selected up to flowering such as early flowering date, plant height at flowering. After flowering, traits such as high fruit setting, uniform fruit maturity, plant height at maturity, high seed yield and high seed quality, were selected using mass selection (only female plants were selected after pollination).

Statements of Uniformity and Stability

AU Durbin is an open pollinated cultivar. All open pollinated plants have an inherent variability larger than plants with other types of reproduction. AU Durbin has been observed for two generations of seed increase and it is uniform and stable. It may have some slightly taller and later maturing plants at a frequency of less than 1.5%. AU Durbin shows no variants other than what would normally be expected due to environment and genetic variability inherent to open pollinated plants.

AU Durbin Distinguishing Characters from PI 207657

Differences between AU Durbin and PI 207657 underestimate the actual values because not all plants grown from the seed obtained from the National Plant Germplasm System matured and reproduced. Statistics of each character are in Table 1. All these characters were significantly different at the two locations where tested. They are:

1) Diameter of the Main Stem at the Base at Flowering Time. AU Durbin has thinner stems (7.0-7.3 cm) than PI 207657 (9.0-9.2 cm). Standard deviation of the values for AU Durbin was smaller than for PI 207657.
2) Height to First Flower. AU Durbin starts flowering at a lower height (89-90 cm) than PI 207657 (102-106 cm). Standard deviation of the values for height to first flower of AU Durbin was smaller than for PI 207657.
3) Height at Seed Harvest. AU Durbin had shorter plants (153.0-144.3 cm) than PI 207657 (185.0-170.9 cm) at seed harvest. Standard deviation of the values for AU Durbin was smaller than for PI 207657. Seed of some late flowering plants of PI 207657were not harvested because the plants were too late to mature, thus all the statistics of height at seed harvest underestimate the actual difference between AU Durbin and PI 207657.

AU Durbin and PI 207657 were compared in experiments conducted at two locations (Tallassee and Shorter) in Ala. Soil at Tallassee was a Norfolk sandy loam (fine-loamy, mixed, thermic Typic Hapludult) and at Shorter a Compass sandy loam (coarse-loamy, siliceous, subactive, thermic Plinthic Paleudults). The experiments were conducted in a randomized complete block design with five replications. Seeding dates were 28 Apr. and 24 Apr. 2009 at Tallassee and Shorter, respectively. Populations were assigned to plots that were two rows 36 inches (90 cm) apart and 15 feet (4.5 m) in length per population. In each replication, 40 random plants of each population were tagged and identified soon after emergence. Data were tested for equality of variance and differences between means of the two populations were tested using the t-test. Satterthwaite's method was used for the t-test for the few cases where variances were not equal. All data were analyzed using the SAS (v 9.1) statistical package (SAS Institute, 2003).

TABLE 3

Characteristics of the sunn hemp cultivar AU Durbin that differentiate it from PI 207657. Mean (standard deviation) values, probability, t-value and number of plants measured (AU Durbin, PI 207657) measured at Tallassee and Shorter, Alabama, in 2009 are presented.

| Populations | Stem Diameter at Base, mm | Height to First Flower, cm | Height at Seed Harvest, cm |
|---|---|---|---|
| Tallassee | | | |
| AU Durbin | 7.3 (2.1) | 89 (24.6) | 191 (33.3) |
| PI 207657 | 9.0 (3.6) | 102 (34.4) | 223 (41.8) |
| Probability | 0.012 | 0.024 | 0.006 |
| t-value | 3.25 | 2.79 | 3.67 |
| No. Plants | 140, 140 | 140, 140 | 130, 130 |
| Shorter | | | |
| AU Durbin | 7.0 (2.2) | 90 (26.7) | 182 (38.8) |
| PI 207657 | 9.2 (6.1) | 106 (37.8) | 220 (42.0) |
| Probability | 0.031 | 0.013 | 0.001 |
| t-value | 3.07 | 3.17 | 5.14 |
| No. Plants | 130, 125 | 130, 125 | 120, 105 |

Statement of Distinctness Between AU Durbin and AU Golden Sunn Hemp
1) Height to First Flower. AU Durbin plants (89.3-89.8 cm) are taller than AU Golden plants (69.6-71.9 cm) when they start flowering.
2) Leaf Size, Length. AU Durbin has longer leaves (9.0-9.9 cm) than AU Golden (8.2-8.9 cm)
3) Number of Days from Planting to Seed Harvest. AU Durbin needed 17-21 more days than AU Golden to star harvesting seed (144.6-145.4 days vs. 123.8-128.4 days, respectively).
4) Height at Seed Harvest. AU Durbin has taller plants (182.5-190.9 cm) at maturity than AU Golden (144.3-152.9 cm).

AU Durbin and AU Golden were compared in experiments conducted at two locations (Tallassee and Shorter) in Ala. Soil at Tallassee was a Norfolk sandy loam (fine-loamy, mixed, thermic Typic Hapludult) and at Shorter was a Compass sandy loam (coarse-loamy, siliceous, subactive, thermic Plinthic Paleudults). The experiments were conducted in a randomized complete block design with five replications. Seeding dates were 28 Apr. and 24 Apr. 2009 at Tallassee and Shorter, respectively. Populations were assigned to plots that were two rows 36 inches (90 cm) apart and 15 feet (4.5 m) in length per population. In each replication, 40 random plants of each population were tagged and identified soon after emergence. Some of those plants did not survive until maturity. Data were tested for equality of variance and differences between means of the two populations were tested using the t-test. Satterthwaite's method was used for the t-test for the few cases where variances were not equal. All data were analyzed using the SAS (v 9.1) statistical package (SAS Institute, 2003).

Statistics of each character are in Table 4. All these characters were significantly different at both locations.

TABLE 4

Characteristics of the sunn hemp cultivar AU Durbin that differentiate it from AU Golden. Mean (standard deviation) values, probability, t-value and number of plants measured (AU Durbin, AU Golden) measured at Tallassee and Shorter, Alabama, in 2009 are presented.

| Populations | Height to First Flower, cm | Leaf Length, mm | Days to Seed Harvest | Height at Seed Harvest, cm |
|---|---|---|---|---|
| Tallassee | | | | |
| AU Durbin | 89.3 (24.6) | 9.9 (1.6) | 145.4 (20.9) | 190.9 (33.3) |
| AU Golden | 69.6 (15.6) | 8.9 (1.7) | 128.4 (11.0) | 152.9 (18.5) |
| Probability | 0.005 | 0.002 | 0.003 | 0.001 |
| t-value | −4.34 | −4.69 | −4.33 | −4.84 |
| No. Plants | 140, 130 | 140, 130 | 125, 115 | 130, 120 |
| Shorter | | | | |
| AU Durbin | 89.8 (26.7) | 9.0 (1.7) | 144.6 (21.2) | 182.5 (38.8) |
| AU Golden | 71.9 (16.8) | 8.2 (1.5) | 123.8 (12.4) | 144.3 (20.1) |
| Probability | 0.011 | 0.029 | 0.018 | 0.001 |
| t-value | −3.29 | −2.67 | −2.98 | −5.7 |
| No. Plants | 130, 130 | 130, 130 | 110, 125 | 120, 120 |

Statement of Distinctness Between AU Durbin and Tropic Sun Sunn Hemp
2) AU Durbin can flower in the continental USA (100% of the plants that grew to maturity flowered at Tallassee and Shorter, Ala., in 2009) whereas Tropic Sun had only 5.4-6% of the plants producing flowers (13 out of 200 plants flowered in 2008 at Tallassee, Ala.; 10 out 186 flowered in 2008 at Shorter, Ala.).

Only some plants of Tropic Sun can have a few flowers. Most commonly, flowers in the inflorescence of Tropic Sun abort. On the contrary, AU Durbin produces healthy inflorescences and flowers.
2) AU Durbin can produce seed in the continental USA. All plants of AU Durbin that survive up to maturity produce seed whereas none of the Tropic Sun plants has ever produced live seed. Rarely, one of the Tropic Sun plants has a fruit with a few rotten seeds. Tropic Sun cannot produce commercial amounts of seeds in the continental USA even in areas that are around 28° N where some seed production has been reported in locations such as southern parts of Texas and Florida. Tropic Sun is considered by its developers to have inconsistent seed production above 28° N.

We cannot provide data from a test comparing AU Durbin to Tropic Sun in its ability to produce seed because Tropic Sun cannot produce seed (0 kg/ha, 0 lb/a) in our region whereas AU Durbin produced 1,869-2,771 kg/ha (1,668-2,472 lb/a) in tests conducted in 2009 and 2010 at Tallassee and Shorter, Ala.

Variability of Dry Matter and N Production of Sunn Hemp Grown in Alabama.

AU Golden and AU Durbin were planted in Tallassee and Shorter Ala. in 2009. The table below shows the results of three plantings of AU Durbin and AU Golden as compared to South African grown Tropic Sun. Harvesting was 42 to 49 days after planting and biomass yield at each planting site and Nitrogen production were measured as shown in the Table below. No significant differences were measured among the different cultivars for any of the traits measured.

| Planting Date | Biomass Yield* lb/a | N Production* lb/a |
|---|---|---|
| APRIL | | |
| AU Durbin - AU Golden | 1,818-3,017 | 30-72 |
| South Africa - Tropic Sun | 1,652-2,792 | 29-65 |
| JUNE | | |
| AU Durbin - AU Golden | 7,836-10,107 | 136-163 |
| South Africa - Tropic Sun | 10,157-10,686 | 172-184 |
| AUGUST | | |
| AU Durbin - AU Golden | 2,203-4,160 | 47-93 |
| South Africa - Tropic Sun | 3,827-4,636 | 80-112 |

*The values for each planting date are from each location.

Notably, AU Golden and AU Durbin leave, on the average of two locations and three planting dates, the equivalent of (values are rounded for Golden, values for Durbin were close to those of Golden) 89 lb N $a^{-1}$, 22 lb P $a^{-1}$ ($P_2O_5$), 83 lb K $a^{-1}$ ($K_2O$), 38 lb Ca $a^{-1}$, and 40 lb Mg $a^{-1}$ in the biomass on top of the ground after harvesting. Thus AU Durbin and AU Golden have similar performance in Alabama as Tropic Sun does in tropical environments.

I claim:

1. A sunn hemp plant that produces seeds when grown in sub-tropic or southern temperate zones, or a seed part thereof, wherein the plant is 'AU Golden', a representative sample of the seeds having been deposited with the American Type Culture Collection under Accession No. PTA-120577.

2. A sunn hemp plant capable of producing seeds when grown in sub-tropic or southern temperate zones, or a seed part thereof, wherein the plant is 'AU Durbin', a representative sample of the seeds having been deposited with the American Type Culture Collection under Accession No. PTA-120576.

3. The sunn hemp plant of claim 1 or 2, wherein the sunn hemp plant produces seed when grown in areas north of 28° N or south of 28° S.

4. The sunn hemp plant of claim 1 or 2, wherein the sunn hemp plant produces seed when grown between 28° N and 40° N or S latitude.

5. The sunn hemp plant of claim 1 or 2, wherein the sunn hemp plant produces more than 400 lbs of seed per acre.

6. The sunn hemp plant of claim 1 or 2, wherein the sunn hemp plant produces more than 1,000 lbs of seed per acre.

7. The sunn hemp plant of claim 1 or 2, wherein the seed has a germination rate of at least 70%.

8. The sunn hemp plant of claim 1 or 2, wherein the sunn hemp plant produces mature flowers over 70% of the time when grown in the sub-tropic or southern temperate zones.

9. The sunn hemp plant of claim 1 or 2, wherein the sunn hemp plant produces mature flowers over 90% of the time when grown in the sub-tropic or southern temperate zones.

10. Progeny of the plant of claim 1, wherein said progeny has all the physiological and morphological characteristics of 'AU Golden' when grown under the same environmental conditions.

11. A plurality of the plant of claim 1 or 2, grown in a field.

12. A container comprising seed of the plant of claim 1 or 2.

13. A method of producing a commodity plant product comprising obtaining the plant of claim 1 or 2 or a part thereof and producing a commodity plant product therefrom.

14. The method of claim 13, wherein the commodity plant product is seed, green manure, animal feed, fiber-based products, plastic or synthetic-based products reinforced with plant fibers, bio-energy, protein concentrate or protein isolate.

15. A seed of sunn hemp variety 'AU Golden', a representative sample of seeds having been deposited with the American Type Culture Collection under Accession No. PTA-120577.

16. A plant part of the plant of claim 1 or 2.

17. The plant part of claim 16, wherein the plant part is a seed.

18. A hybrid seed produced by crossing the plant of claim 1 or 2 with a second, distinct sunn hemp variety.

19. A hybrid plant grown from the seed of claim 18.

20. Progeny of the plant of claim 2, wherein said progeny has all the physiological and morphological characteristics of 'AU Durbin' when grown under the same environmental conditions.

21. A seed of sunn hemp variety 'AU Durbin', a representative sample of seeds having been deposited with the American Type Culture Collection under Accession No. PTA-120576.

* * * * *